US010348881B2

United States Patent

Seetharaman et al.

(10) Patent No.: US 10,348,881 B2

(45) Date of Patent: *Jul. 9, 2019

(54) OFFLINE VOICEMAIL

(71) Applicant: Microsoft Technology Licensing, LLC, Redmond, WA (US)

(72) Inventors: Shivakumar Seetharaman, Snoqualmie, WA (US); Michael K. Higashi, Issaquah, WA (US); Selvaraj Nalliah, Redmond, WA (US); Joseph T. Flint, Sammamish, WA (US); Salman Zafar, Mill Creek, WA (US); Juan V. Esteve Balducci, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,627

(22) Filed: Mar. 20, 2018

(65) Prior Publication Data

US 2018/0213074 A1 Jul. 26, 2018

Related U.S. Application Data

(63) Continuation of application No. 15/647,374, filed on Jul. 12, 2017, now Pat. No. 9,936,061, which is a (Continued)

(51) Int. Cl.

*H04M 11/00* (2006.01)

*H04M 1/725* (2006.01)

(Continued)

(52) U.S. Cl.

CPC .......... *H04M 1/7255* (2013.01); *G10L 15/26* (2013.01); *H04M 3/533* (2013.01); *H04M 3/537* (2013.01);

(Continued)

(58) Field of Classification Search

CPC .......... H04M 1/7255; H04M 1/72552; H04M 3/533; H04M 3/53333; G10L 15/26

(Continued)

(56) References Cited

U.S. PATENT DOCUMENTS 5,647,002 A 7/1997 Brunson 5,978,672 A 11/1999 Hartmaier et al.

(Continued)

FOREIGN PATENT DOCUMENTS

EP 926871 6/1999

EP 1755324 2/2007

(Continued)

OTHER PUBLICATIONS

"Phonewire Home Office, Small Office, Mobile Office," 2008, Phonewire, Inc., http://www.phonewire.com/cc/, 1 pg.

(Continued)

*Primary Examiner* — Van D Huynh

(57) ABSTRACT

A method for accessing offline voicemail messages within a mobile messaging application may be provided. First, a voice mail message may be received and the voicemail message may be transcribed to text. Next, the voicemail message and the text transcription may be stored. The recipient may then be presented with a list of voicemail messages and the voicemail message may be retrieved in response to the recipient. The recipient may read or listen to the voicemail message or both. The recipient may also annotate the voicemail message.

20 Claims, 5 Drawing Sheets

Related U.S. Application Data continuation of application No. 15/251,032, filed on Aug. 30, 2016, now Pat. No. 9,723,125, which is a continuation of application No. 14/534,795, filed on Nov. 6, 2014, now Pat. No. 9,479,646, which is a continuation of application No. 14/186,908, filed on Feb. 21, 2014, now Pat. No. 8,942,359, which is a continuation of application No. 13/647,225, filed on Oct. 8, 2012, now Pat. No. 8,903,057, which is a continuation of application No. 12/239,994, filed on Sep. 29, 2008, now Pat. No. 8,284,909.

(51) Int. Cl.
*H04M 3/533* (2006.01)
*H04M 3/537* (2006.01)
*G10L 15/26* (2006.01)
*H04W 4/14* (2009.01)

(52) U.S. Cl.
CPC ......... *H04M 3/53333* (2013.01); *H04W 4/14* (2013.01); *H04M 2201/60* (2013.01); *H04M 2203/253* (2013.01); *H04M 2203/4509* (2013.01)

(58) Field of Classification Search
USPC ....................................................... 379/88.14
See application file for complete search history.

(56) References Cited

U.S. PATENT DOCUMENTS 6,219,646 B1 4/2001 Cherny
6,633,630 B1 10/2003 Owens et al.
6,775,360 B2 * 8/2004 Davidson ............ H04M 1/6505 379/52
7,545,784 B2 6/2009 Mgdechian et al.
7,640,233 B2 12/2009 Baartman et al.
7,725,098 B1 5/2010 Claudatos et al.
8,284,909 B2 10/2012 Seetharaman et al.
8,335,689 B2 12/2012 Wittenstein et al.
8,903,057 B2 12/2014 Seetharaman et al.
8,942,359 B2 1/2015 Seetharaman et al.
9,479,646 B2 10/2016 Seetharaman et al.
2002/0154745 A1 * 10/2002 Shtivelman ........... H04M 1/575 379/88.12
2002/0178002 A1 11/2002 Boguraev et al.
2003/0177008 A1 9/2003 Chang
2003/0220784 A1 * 11/2003 Fellenstein ........... H04M 3/533 704/201
2003/0228863 A1 12/2003 Vander Veen
2004/0102957 A1 5/2004 Levin
2005/0021339 A1 1/2005 Ruetschi
2005/0201362 A1 9/2005 Klein et al.
2005/0266829 A1 12/2005 Tran
2006/0025113 A1 2/2006 Nguyen et al.
2006/0074671 A1 4/2006 Farmaner
2006/0106614 A1 * 5/2006 Mowatt .................. G06F 3/167 704/275
2006/0177024 A1 8/2006 Frifeldt
2006/0233319 A1 * 10/2006 Van Zandt ............ H04M 3/436 379/67.1
2006/0234680 A1 10/2006 Doulton
2007/0038436 A1 2/2007 Cristo et al.
2007/0071206 A1 3/2007 Gainsboro et al.
2007/0101133 A1 * 5/2007 Liu ..................... H04L 63/0485 713/168
2007/0123280 A1 * 5/2007 McGary .................. H04L 51/18 455/466
2007/0127688 A1 6/2007 Doulton
2007/0207785 A1 9/2007 Chatterjee
2008/0037529 A1 2/2008 Bangalore et al.
2008/0177786 A1 * 7/2008 Faisman ................ G06F 16/40
2008/0205610 A1 8/2008 Bishop
2008/0319744 A1 12/2008 Goldberg
2009/0024389 A1 1/2009 Khouri et al.
2009/0172108 A1 7/2009 Singh
2010/0144329 A1 6/2010 Lasensky et al.
2010/0217591 A1 8/2010 Shpigel
2011/0087491 A1 4/2011 Wittenstein et al.
2016/0373567 A1 12/2016 Seetharaman et al.
2017/0318144 A1 11/2017 Seetharaman et al.

FOREIGN PATENT DOCUMENTS

WO 2001011824 2/2001
WO 2007002753 1/2007

OTHER PUBLICATIONS

Disclosure Title: “Improved Correction of Stenographers' Errors through Audio Playback”, IBM Technical Disclosure Bulletin, TBA-ACC-No. NA9306293, Jun. 1993, US vol. No. 36, Issue 6A, p. 293-296, Publication-Date: Jun. 1, 1993.

Heuer, et al., “Adaptive Multimedia Messaging based on MPEG-7—The M3-Box”,In Proceeding of 2nd International Symposium on Mobile Multimedia Systems & Applications, Nov. 9, 2000, pp. 6-13.

Hindus, Debby et al., “Ubiquitous Audio: Capturing Spontaneous Collaboration”, MIT Media Lab, Cambridge, MA, USA, 1992 ACM, CSCW 92 Proceedings, Nov. 1992, pp. 210-217.

TDB-ACC-No. NA9306293, Disclosure Title: “Improved Correction of Stenographers' Errors through Audio Playback”, Publication—Data: IBM Technical Disclosure Bulletin, Jun. 1993, US vol. No. 36, Issue No. 6A, p. 293-296, Publication-Date: Jun. 1, 1993 (Jun. 1, 1993), 3 pages total.

U.S. Appl. No. 12/239,994, Advisory Action dated May 10, 2012, 3 pgs.

U.S. Appl. No. 12/239,994, Amendment and Response filed Dec. 27, 2011, 11 pgs.

U.S. Appl. No. 12/239,994, Amendment and Response filed Apr. 18, 2012, 8 pgs.

U.S. Appl. No. 12/239,994, Letter restarting period for response dated Sep. 30, 2011, 27 pgs.

U.S. Appl. No. 12/239,994, Notice of Allowance dated Jun. 8, 2012, 10 pgs.

U.S. Appl. No. 12/239,994, Office Action dated Jan. 18, 2012, 9 pgs.

U.S. Appl. No. 12/239,994, Office Action dated Aug. 24, 2011, 29 pgs.

U.S. Appl. No. 13/647,225, Amendment and Response filed Jul. 15, 2013, 11 pgs.

U.S. Appl. No. 13/647,225, Notice of Allowance dated Jan. 7, 2014, 10 pgs.

U.S. Appl. No. 13/647,225, Notice of Allowance dated Apr. 14, 2014, 9 pgs.

U.S. Appl. No. 13/647,225, Notice of Allowance dated Aug. 1, 2014, 8 pgs.

U.S. Appl. No. 13/647,225, Notice of Allowance dated Aug. 25, 2014, 2 pgs.

U.S. Appl. No. 13/647,225, Notice of Allowance dated Sep. 26, 2013, 9 pgs.

U.S. Appl. No. 13/647,225, Office Action dated Mar. 13, 2013, 11 pgs.

U.S. Appl. No. 13/647,225, Supplemental Notice of Allowance dated Nov. 5, 2014, 2 pgs.

U.S. Appl. No. 14/186,908, Amendment and Response filed Jul. 25, 2014, 11 pgs.

U.S. Appl. No. 14/186,908, Notice of Allowance dated Dec. 26, 2016, 2 pages.

U.S. Appl. No. 14/186,908, Notice of Allowance dated Aug. 15, 2014, 9 pgs.

U.S. Appl. No. 14/186,908, Office Action dated May 6, 2014, 10 pgs.

U.S. Appl. No. 14/186,908, Supplemental Notice of Allowance dated Sep. 18, 2014, 2 pgs.

U.S. Appl. No. 14/534,795, 312 amendment filed Sep. 1, 2016, 6 pages.

(56) References Cited

OTHER PUBLICATIONS

U.S. Appl. No. 14/534,795, Notice of Allowance dated Jun. 22, 2016, 10 pgs.
U.S. Appl. No. 14/534,795, Notice of Allowance dated Jul. 6, 2016, 2 pgs.
U.S. Appl. No. 14/534,795, Response to 312 Amendment, dated Sep. 15, 2016, 2 pages.
U.S. Appl. No. 15/251,032, Amendment after Allowance filed Apr. 24, 2017, 8 pages.
U.S. Appl. No. 15/251,032, Amendment and Response filed Jan. 5, 2017, 8 pages.
U.S. Appl. No. 15/251,032, Notice of Allowance dated Mar. 22, 2017, 11 pages.
U.S. Appl. No. 15/251,032, Office Action dated 210/6/2016, 6 pages.
U.S. Appl. No. 15/251,032, USPTO Response dated May 3, 2017, 2 pages.
U.S. Appl. No. 15/647,374, 312 Amendment filed Feb. 22, 2018, 7 pages.
U.S. Appl. No. 15/647,374, Amendment and Response filed Nov. 13, 2017, 9 pages.
U.S. Appl. No. 15/647,374, Notice of Allowance dated Nov. 24, 2017, 11 pages.
U.S. Appl. No. 15/647,374, Office Action dated Aug. 11, 2017, 8 pages.
Welch-Abernathy, Dameon, "SpinVox: Speech to Text for Your Mobile," Dec. 14, 2007, The Mobile Weblog—Mobile 2.0, http://www.mobile-weblog.com/50226711/spinvox_speech_to_text_for_your_mobile.php, 3 pgs.
Whittaker, Steve et al., "SCANMail: a voicemail interface that makes Speech browsable, readable, and searchable", AT&T Labs-Research, Florham Park, NJ, USA, Letters CHI, vol. 4, Issue No. 1, Apr. 20-25, 2002, pp. 275-282.

* cited by examiner

OFFLINE VOICEMAIL

CROSS-REFERENCE TO RELATED APPLICATIONS

This application is a continuation application of U.S. patent application Ser. No. 15/647,374, (now U.S. Pat. No. 9,936,061), entitled "OFFLINE VOICEMAIL," filed Jul. 12, 2017, which is a continuation application of U.S. patent application Ser. No. 15/251,032(now U.S. Pat. No. 9,723,125), entitled "OFFLINE VOICEMAIL," filed Aug. 30, 2016, which is a continuation application of U.S. patent application Ser. No. 14/534,795(now U.S. Pat. No. 9,479,646), entitled "OFFLINE VOICEMAIL," filed Nov. 6, 2014, which is a continuation application of U.S. patent application Ser. No. 14/186,908(now U.S. Pat. No. 8,942,359), entitled "OFFLINE VOICEMAIL," filed on Feb. 21, 2014, which is a continuation application of U.S. patent application Ser. No. 13/647,225(now U.S. Pat. No. 8,903,057), entitled "OFFLINE VOICEMAIL," filed on Oct. 8, 2012, which is a continuation application of U.S. patent application Ser. No. 12/239,994(now U.S. Pat. No. 8,284,909), entitled "OFFLINE VOICEMAIL," filed on Sep. 29, 2008, the entire disclosures of which are hereby incorporated herein by reference.

BACKGROUND

Voicemail is a system for managing telephone messages. Conventional systems are problematic from a recipient experience perspective in a number of instances. Firstly, the recipient may have to dial-in to check voicemail messages. Dialing in to check voicemail messages takes time and is not appropriate in a number of social contexts when a phone call cannot be made. Secondly, interfaces are often serialized and require listening to all voicemail messages in order, without regard to priority. Thirdly, there is a lack of integration with other communication modes (i.e., replying to a voicemail with an email is not supported.) And fourthly, a model to take notes or add context to the voicemail message is not available.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A method for accessing offline voicemail messages within a mobile messaging application may be provided. First, a voice mail message may be received and the voicemail message may be transcribed to text. Next, the voicemail message and the text transcription may be stored. The recipient may then be presented with a list of voicemail messages and the voicemail message may be retrieved in response to the recipient. The recipient may read or listen to the voicemail message or both. The recipient may also annotate the voicemail message.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
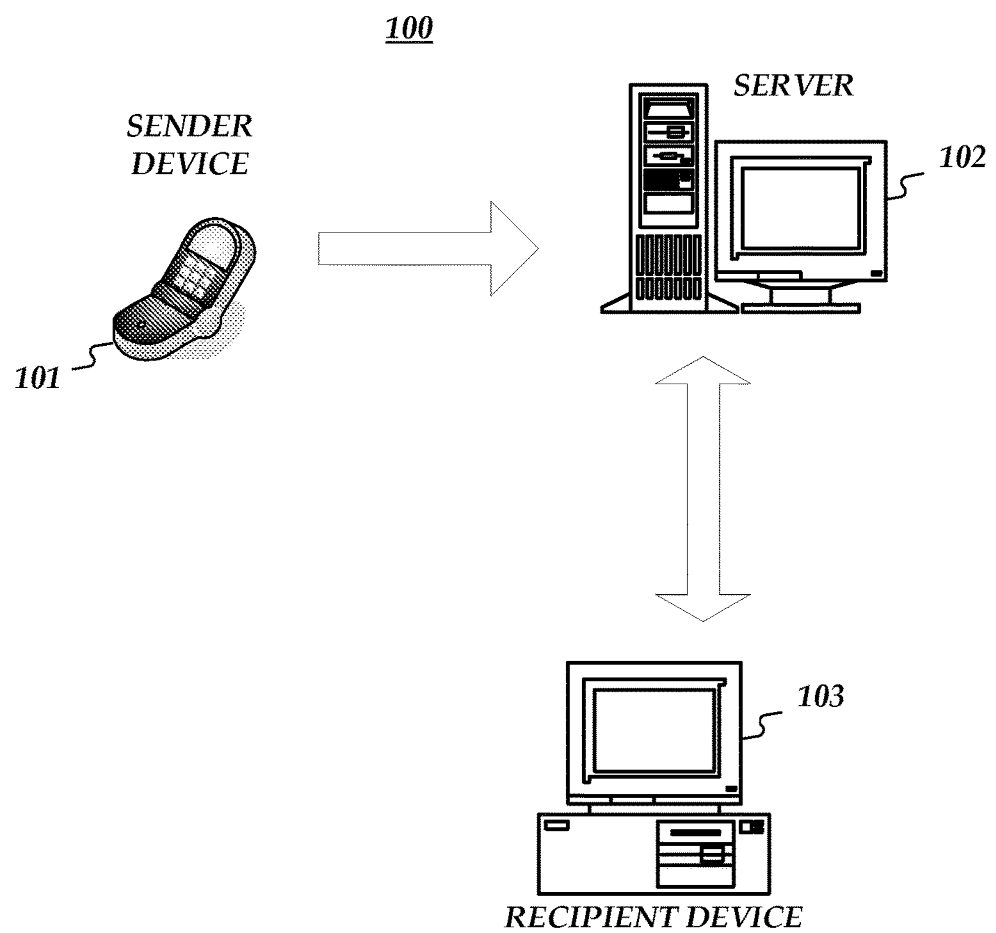
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

FIG. 1 is a block diagram of an operating environment setting forth the general environment involved in a messaging system 100 consistent with embodiments of the present invention. System 100 may enable a sender, using a sender device 101, to send a voicemail message to a server 102. Consistent with embodiments of the present invention, sender device 101 may comprise any device capable of sending and receiving messages and is not limited to a mobile telephone or a personal computer (PC). Server 102 may comprise any server capable of transcribing the voicemail message from speech to text. Server 102 may also be capable of storing transcribed voicemail messages, providing notifications of missed calls and voicemail messages to a recipient, receiving annotated messages, and synchronizing voicemail messages with a recipient device 103.

After server 102 receives the voicemail message from sender device 101 and transcribes the voicemail message, recipient device 103 may download, store, and present a recipient with the voicemail message and text transcription. Recipient device 103 may be, but is not limited to, a client computer or a mobile device such as a mobile telephone or personal data assistant (PDA). Recipient device 103 may allow the recipient to deal with voicemail messages without the recipient having to dial-in to a service or listening to the voicemail message.

Figure 2:
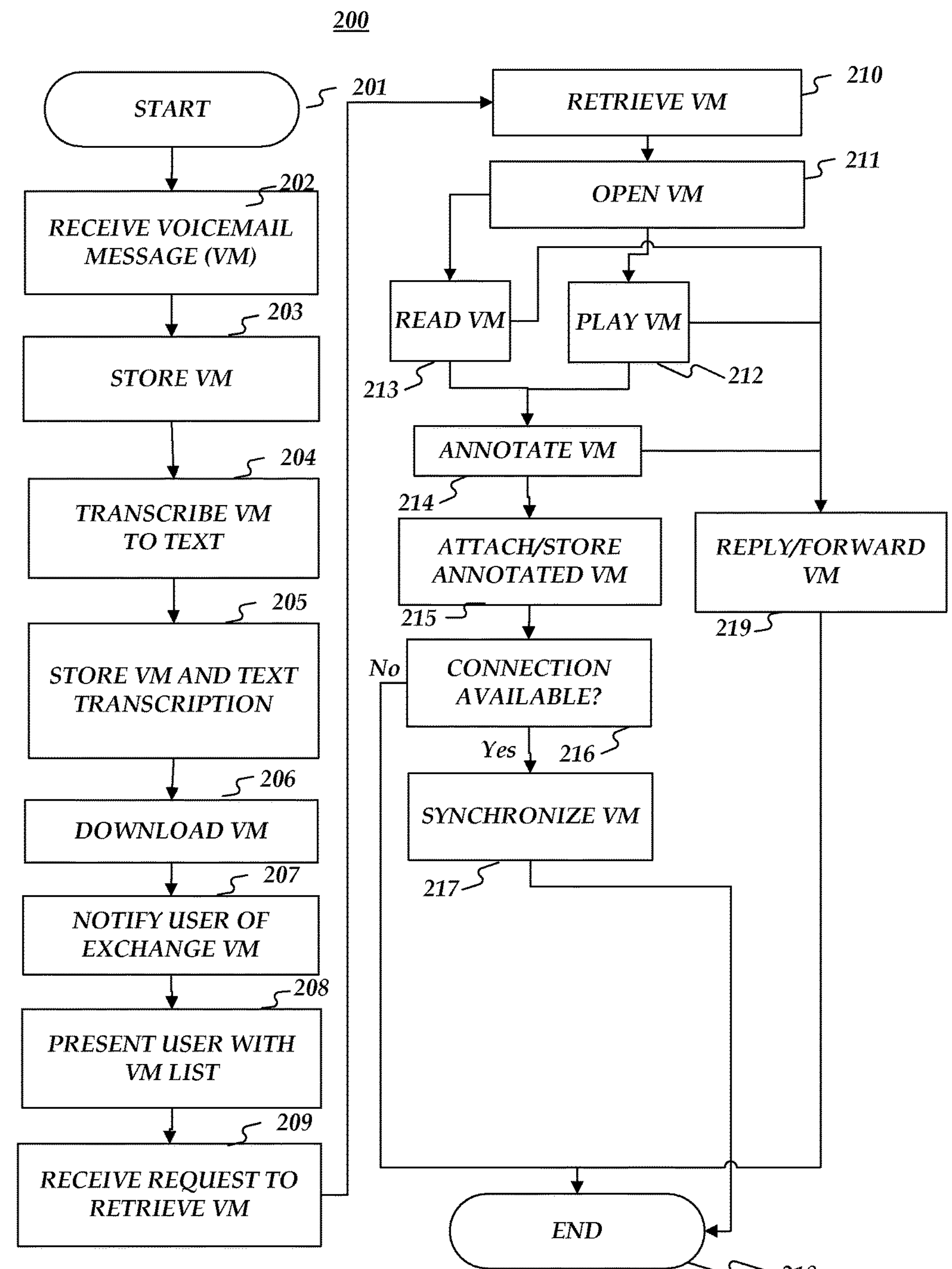
FIG. 2 is a flow diagram of a method of accessing an offline voicemail message.

FIG. 2 is a flow diagram setting forth the general stages involved in a method 100 consistent with an embodiment of the invention for accessing offline voicemail messages. Method 200 may be implemented using a computing device 600 as described in more detail below with respect to FIG. 6. Ways to implement the stages of method 200 may be described in greater detail below. Method 200 may begin at starting block 201 and proceed to stage 202 where a phone system (not shown) may receive a voicemail message or a missed call notification from a sender. The phone system may be integrated with server 102. For example, when the sender places a call to the recipient and the call is missed, instead of the voicemail message or the missed call notification being left on a recipient's phone mailbox (the recipient's phone comes with an offline voicemail mailbox), the voicemail message may go to the server's mailbox. When receiving the voicemail message or the missed call notification, server 102 may recognize a telephone number or the sender and generate the sender's information. Generating the sender's information comprises at least one of the following: searching, fetching and providing an electronic mail address, searching, fetching and providing a physical address, searching, fetching and providing a website link, and searching, fetching and providing other configured information about the recognized number or the recognized sender.

From stage 202, where server 102 received the voicemail message, method 200 may advance to stage 203 where the server 102 may store the voicemail message in the server mailbox. After stage 203, method 200 may proceed to stage 204 where exchange voicemail messages (EVMs) are automatically transcribed to text on server 102. EVMs are voicemails stored on server 102. At stage 205, the EVM and the text transcription are integrated. The integration of the text transcription and the EVM comprises allowing a recipient to switch from text transcription to the EVM. Switching from the text transcription to the EVM comprises selecting a point in the text transcription and playing the EVM from the selected point in the text transcription. The test transcription and the EVM may be encrypted during this process.

During the transcribing of the EVM to text, method 200 may denote unrecognized voicemail speech in the EVM with at least one of the following: font, color, and size. After stage 204, method 200 may proceed to stage 205 where the EVMs and the text transcriptions are stored. After server 102 stores the voicemail message at stage 205, method 200 may continue to stage 206 where recipient device 103 may download emails and voicemail messages from server 102. Recipient device 103 may download emails from server 102 that may also contain voicemail messages in the form of an email.

After stage 206, method 200 may proceed to stage 207 where the recipient may be notified that EVMs and missed calls are available. The notifications distinguish offline voicemail messages from conventional voicemail messages that a phone operator may provide. The recipient may also be notified of missed calls when recipient device 103 is connected to server 102. For example, there may be missed calls when the recipient is offline that may be stored on server 102. When recipient device 103 is later connected with server 102, the missed calls may be sent to recipient device 103.

The voicemail messages and the missed calls may be integrated into a notification system as follows. For both voicemail messages and missed calls, they may each have their own notification type. The voicemail messages and the missed calls may not be counted as part of a new email notification. Voicemail and missed call notifications may be dismissed if the recipient goes to a voicemail pivot. (See example 3 below for more details.)

Single voicemail and missed call notifications may take the recipient directly to a specific interface. Whereas, multiple voicemail and missed calls notifications may take the recipient to the voicemail pivot.

EXAMPLE 1

Single Voicemail Notification

Figure 3:
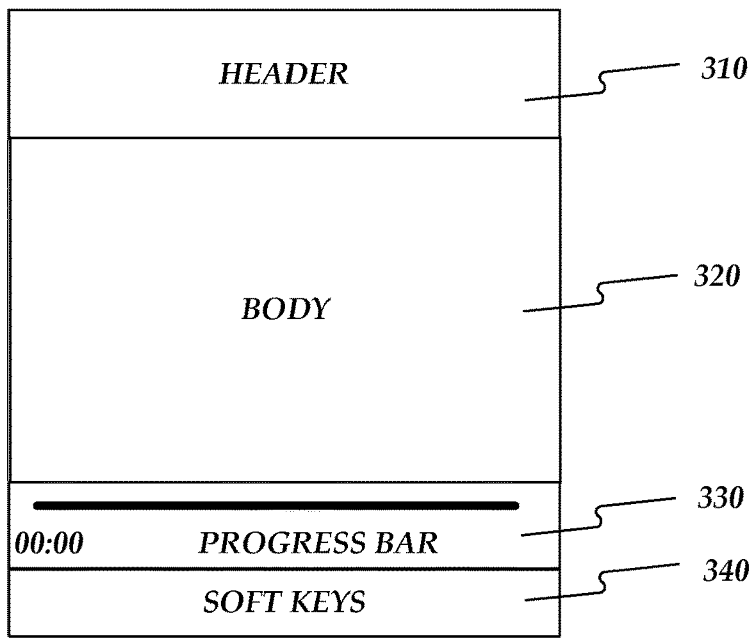
FIG. 3 is an illustration of a recipient interface.

A single voicemail may prompt a single voicemail notification. FIG. 3 is an illustration of a recipient interface. The recipient can click on single voicemail notification by clicking on "View" on a soft key 340 and is taken to the recipient interface. The voicemail notification may be dismissed upon taking the recipient to the recipient interface.

EXAMPLE 2

Single Missed Call Notification

This is just like the prior scenario, just with a special missed call notification and icon.

EXAMPLE 3

Mixed mode (a single voicemail messages, multiple missed calls, and multiple electronic mails). There may be three different notifications: (1) A notification for voicemail message (clicking "View" may take recipient to the recipient interface, and may only dismiss the voicemail notification); (2) Multiple missed calls notification (clicking "view" may take the recipient to the voicemail pivot, may dismiss both the voicemail and the missed call notification because the recipient may be taken to the voicemail pivot/list view); and (3) multiple email notifications (clicking "view" may take the recipient to an "unread" pivot, this may dismiss all three notifications because the recipient can see all the messages.)

EXAMPLE 4

Mixed Mode (Multiple Voicemail Messages, Multiple Electronic Mails)

This is a variation on Example 3 above. There may be two different notifications: (1) Multiple voicemail notification (clicking "View" may take the recipient to the Voicemail pivot, only the voicemail notification may be dismissed) and (2) Multiple email notification (clicking "view" may take the recipient to the Unread pivot, both voicemail and email notifications may be dismissed.)

Once the recipient is notified that the EVMs and/or the missed calls are available in stage 207, method 200 may continue to stage 208 where the recipient may be presented with a list of voicemail messages. The recipient may also be presented with an interface for the recipient to interact with. The interface presented may comprise previewing a text transcript, listening to the EVM, deleting the EVM, replying to the EVM, flagging the EVM, or calling back a telephone number from the EVM. The list of EVMs may also be sorted and presented based on a sender or a predetermined context that the recipient has identified.

The presentation of the list of voicemails may be designed to include EVM and missed calls. When the EVM is not linked to other messages, the icon used may be unique. When the EVM is part of a message with more than one message, then the rolled up message may show a standard conversation icon. When the recipient clicks on the message and it expands, then the unique voicemail icon may be displayed next to the EVM.

After the EVMs are presented in stage 208, method 200 may proceed to stage 209 where server 102 may receive a request to retrieve a particular EVM from the recipient.

After the receiving the request to retrieve the EVMs at stage 209, method 200 may proceed to stage 210 where the EVMs or the missed calls are retrieved based upon the recipient's request. The EVM may be retrieved from server 102 or recipient device 103 without dialing into a service. After retrieving the EVMs at stage 210, method 200 proceeds to stage 211 where the recipient may open the EVMs. A User Interface (UI) 300 may be displayed when the recipient opens the EVM which is discussed in FIG. 3 below. The recipient may open the voicemail message just as the recipient would open a traditional email message.

In another embodiment of the invention, recipient device 103 may be configured to automatically retrieve particular EVMs based on a configured request, by the recipient, to retrieve particular EVMs. Based on the recipient's configuration, the request may be automatically retrieved from recipient device 103 and then presented to the recipient at stage 208.

After opening the EVM at stage 211, the method 200 may proceed to stage 212 where the recipient may be able to play audio of the EVM. The EVM may include integrated play controls that let the recipient play, pause, fast forward, or reverse through the audio portion of the voicemail while remaining in the context of a messaging application. The recipient may also download the EVM when available to the recipient. Downloading the EVM audio file while playing is discussed later with respect to FIG. 5 below. The recipient may play or replay any part of the audio by selecting the associated text in a text transcription.

After opening the EVM at stage 211, the method 200 may proceed to stage 213 where the recipient may be able to read the EVM. If the text transcription of the EVM is available, the recipient can read through the text version, or the recipient can play the EVM inline and listen to the EVM. If at some point the recipient would like to listen to the EVM while reading it, the recipient may switch to the EVM by selecting the associated text in the text transcription. The recipient may decide to play a particular portion of the text transcription or replay any part of the audio by selecting the associated text in the text transcription.

The EVM text transcription may include a reading form similar to a traditional email message. The reading form may include detailed caller identification (callerID) information. The reading form may also include integrated play controls that let the recipient play, pause, fast forward, or reverse through the audio portion of the voicemail while remaining in the context of a messaging application. The reading form may be integrated between the EVM, email and text messaging applications. This integration may enable the recipient to smoothly transition between communication modes on recipient device 103.

After stage 211 where the recipient opens the EVM, stage 212 where the recipient plays the EVM, or stage 213 where the recipient reads the EVM, method 200 may proceed to stage 214 where the recipient may take down some notes to associate it with a particular EVM. From stage 214, where the recipient takes down some notes, method 200 may advance to stage 215 where the notes may be attached and stored to the EVM.

From stage 215 where the recipient may attach and store the notes to the EVM, method 200 may proceed to stage 216 where recipient device 103 may try to connect to server 102. If there is a connection available, method 200 may proceed to stage 217 where the annotated voicemail message may be synchronized with the server and the method may end at stage 218.

If a connection is not available to sever 102 at stage 216, the annotated voicemail message may be saved locally on recipient device 103 until there is a connection to synchronize server 102. Recipient device 103 may not be able to connect with server 103 because recipient device 103 may not be in a location that is able to connect with server 102. As a result, the annotated EVM may be saved locally on recipient device 102. After stage 216, the method 200 may end at stage 218.

After stage 211 where the recipient opens the EVM, stage 212 where the recipient plays the EVM, stage 213 where the recipient reads the EVM, or stage 214 where the recipient annotates the EVM, method 200 may advance to stage 219 where the recipient may reply or forward the EVM. The recipient may reply or forward the EVM as an email message based on the transcription, or the recipient can callback the sender based on a phone number displayed. At stage 219, when the recipient replies or forwards the EVM, the recipient may send a mobile message to another recipient based on the phone number or the sender information that recipient device 103 received because the voicemail message can be treated as an email. The mobile message, may be, but is not limited to short message service (SMS), multimedia messaging service (MMS), or email.

When the recipient replies as the email, a full transcript can be shown and sent to other recipient(s). If the recipient decided to forward the voicemail message as an email, the recipient of the forwarded email may get both the text transcript and the original EVM. The recipient of the forwarded EVM may either read the text transcript, listen to the EVM, or both. That is, while the recipient of the forwarded EVM is reading the text transcript, the recipient can switch to play the EVM like the original recipient. All the functions that may have been available to the original recipient may also be available to the forwarded email recipient.

As stated above, FIG. 3 illustrates a recipient user interface (IU) 300. UI 300 may comprise a header section 310 and a body 320. UI 300 may also include a message progress bar 330 that may be used to give visual queues to the recipient about any audio content the EVM may have. UI 300 may also have soft keys 340 that may display actions the recipient may be allowed to perform.

Figure 4:
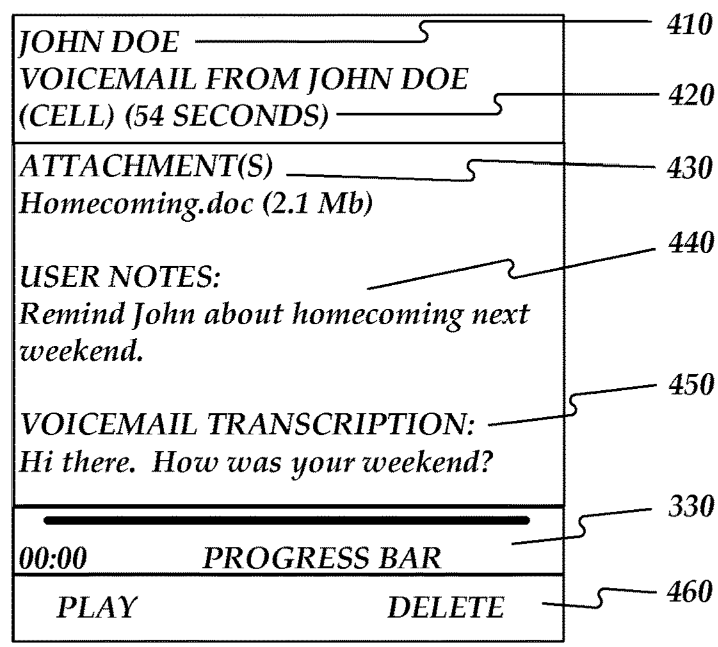
FIG. 4 is the illustration of the recipient interface in FIG. 3 in more detail.

Header section 310 may display as much relevant information about the caller. FIG. 4 is an example of UI 300 with more details in header 310, body 320, progress bar 330, and soft keys 340. As shown in FIG. 4, UI 300 displayed on recipient device 103 may include: a sender/from field 410, a subject 420, and a date and time the voicemail message was received. By default, when UI 300 is opened, the caller's name (e.g. in sender/from field 410) and subject 420 may be displayed.

When the recipient opens UI 300, there may be several different scenarios that sender/from field 410 may accommodate. They include: (1) anonymous caller when there is no-caller information available for the sender, (2) a phone number when the phone number information is available, but it is not on server 102 or the recipient's contact store on server 102, (3) a sender name if the phone number resolved against the recipient's contact store on server 102, and (4) the sender's name and full contact card if the sender is resolved against the recipient's local contacts.

Subject 420 may include the type of device, who the original EVM was sent from, and the length of time of the EVM. The date and time stamp may be not visible on the screen, but may be above header 310. When an audio file is attached to the EVM, the audio file may be suppressed (e.g. not visible in header 310.) The recipient may use soft keys 460 to play the EVM or delete the EVM.

There may be two cases where a voicemail file may have more than one attachment. The first case may be when the recipient adds a file to the existing voicemail message. When there are more files (e.g. non EVM files) attached to the message, those attachments may not be suppressed or hidden in the card, but they may be displayed in UI 300 as an attachment 430 in the header. For example, if the recipient wanted to attach a budget document or the like to the EVM, the attachment may be displayed as attachment 430 in FIG. 4. Recipient device 103 may allow the recipient to add additional attachments to an existing EVM. UI 300 form may have the same type of logic to only display attachment 430 if the recipient has more than one attachment on the file.

The second case may be when the EVM may be forwarded or replied to with an existing EVM. In such a situation, the recipient may call into a voice access to forward or reply to the EVM. The voice access may then allow the recipient to add a voice introduction. When this happens, server 102 or recipient device 103 may stamp a priority attribute on both audio file attachments, so that recipient device 103 and the voice access may know what order to play the files.

UI 300 may continue to suppress the UI audio attachments 430. When the EVM plays, the total duration of all EVM audio files may be calculated. The total length can be displayed in the progress bar 330 and played in sequential order. The duration for the most latest audio file that was appended to the message may be sent, so recipient device 103 can calculate the total duration of all audio files when they are loaded.

Body section 320 may comprise two parts as shown in FIG. 4. The two parts may be voicemail notes 440 and a voicemail text transcription 450. Body section 320 may be subject to a truncation limit, in which case, it may display a link to download rest of the EVM. Notes 440 information may be truncated if it exceeds a predetermined size. The predetermined size limit may be enforced by server 102 or recipient device 103. If body section 320 contents go beyond a screen height, then the recipient may scroll the screen to view all of body section 320 contents.

Message progress bar 330 may always be displayed when UI 300 is opened as discussed above in FIG. 2 at stage 211. The presence of progress bar 330 may help the recipient to understand that the EVM may be available and to prevent choppiness when shifting between stop/pause and play. If body section 320 contents go beyond the screen height, then the recipient may scroll the screen, but message progress bar 330 may remain in the same position.

Messaging progress bar 330 may be based on priority and ranking. For example, types of progress bars 330 with higher rankings may be displayed above other progress bars. For example, in the case of a "Playing" and "Downloading" progress bar, the "Playing" progress bar may be registered with a higher ranking than the "Downloading" progress bar.

Figure 5:
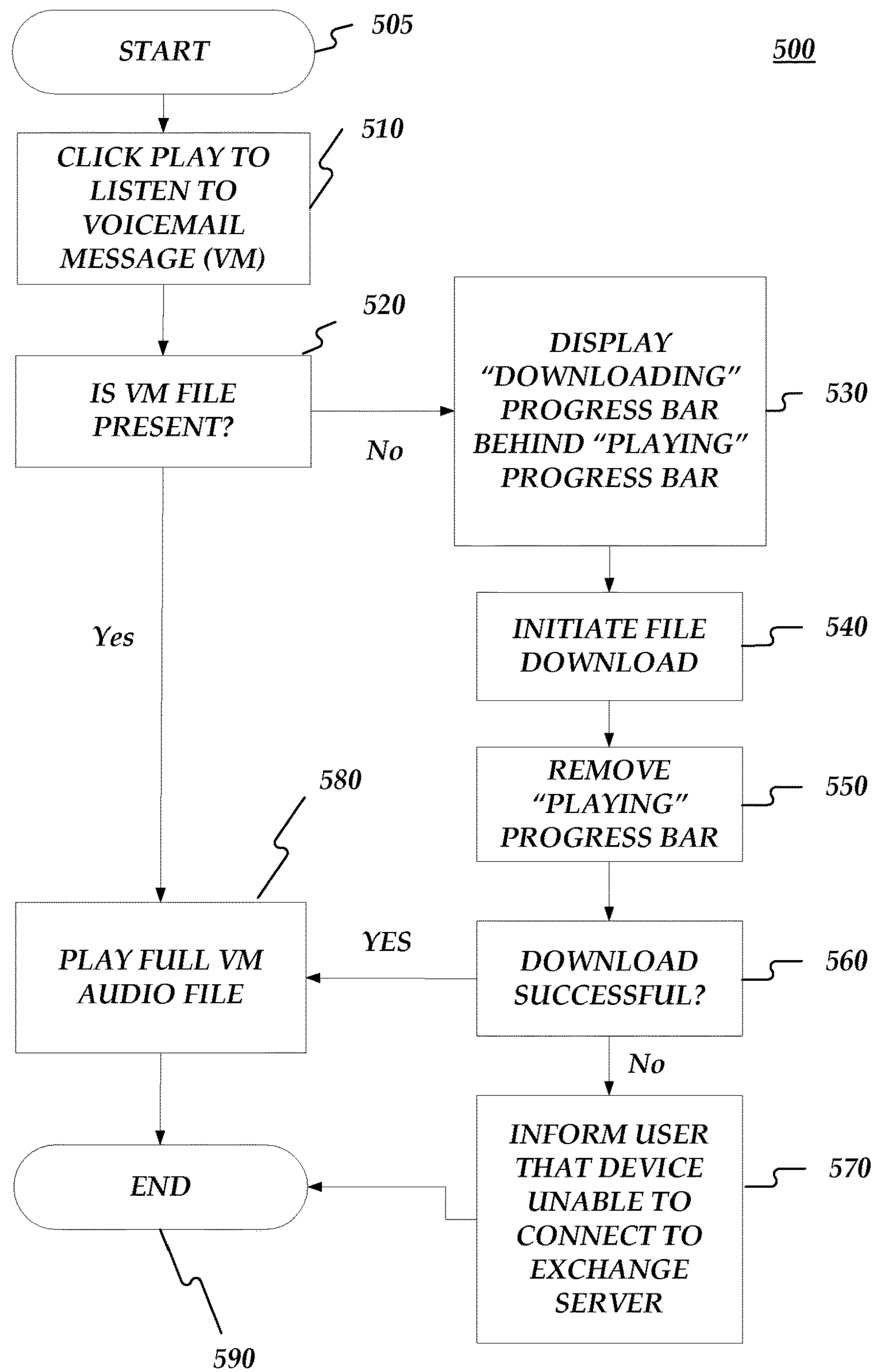
FIG. 5 is a flow diagram of a method of playing and downloading a voicemail message file.

FIG. 5 is a flow chart setting forth the general stages involved in a method 500 consistent with an embodiment of the invention to seamlessly switch between two progress bars in the case where recipient device 103 may need to fetch the rest of the EVM audio file. Method 500 may be implemented using a computing device 600 as described in more detail below with respect to FIG. 6. Ways to implement the stages of method 500 may be described in greater detail below. Method 500 may begin at starting block 505 and proceed to stage 510 where the recipient may click "Play" on the soft key 460 to play the EVM. When the recipient enters into UI 300, the recipient may see progress bar 330, which may provide a visual hint that there is an EVM to be listened. There may be a left and right status, but at the state when UI 300 was opened, the left status may be 00:00 and the right status may have the total duration of the audio file. The total duration may be formatted as mm:ss.

From stage 510, after the recipient clicked "Play" to play and listen to the voicemail message, method 500 may advance to stage 520 where recipient device 103 may try to open the EVM file on the recipient device 103. From stage 510, if the EVM file is present on recipient device 103, the method 500 may proceed to stage 580 where the full EVM audio file may be played. From stage 510, if the EVM file is not present, the method 500 may proceed to stage 530 where the "Downloading" progress bar may be displayed behind the "Playing" progress bar. If the "Playing" progress bar has a higher priority, it may always be displayed in front of the "Downloading" progress bar. This approach may help give the impression that it's the same bar but the status may inform the recipient that the EVM file is downloading.

From stage 530, the method 500 proceeds to stage 540 where the EVM download may be initiated. From stage 540, the method 500 proceeds to stage 550 where the "Playing" progress bar may be removed and the "Downloading" progress bar may be displayed. The recipient may see the left status change to "Downloading" and the right status may then give the total size of the download. The recipient may have the option of canceling the download by clicking "cancel" on soft key 340.

From stage 550, the method 500 may proceed to stage 560 where recipient device 103 may determine whether the EVM file has been downloaded successfully. If the voicemail message file is downloaded successfully the method 500 may proceed to stage 580 where the method 500 may play the full EVM file. Once the voicemail message file has been downloaded, the audio file may begin playing through speaker phones. The recipient can click "speaker on" on soft key 340 to project the sound through an external speaker. When the voicemail message is playing, the recipient may advance through the message or go back using the left and right buttons. The recipient may also decide to play a particular portion of the EVM and start playing the EVM at that or any point in the EVM. The recipient may further decide to skip around the EVM by clicking on different portions of the text transcription. After stage 580, where method 500 played the voicemail message file, method 500 may end at stage 590.

If the file download is unsuccessful, method 500 may proceed to stage 570 where the recipient is informed that recipient device 103 is unable to connect to server 102. And after stage 570, method 500 may end at stage 590.

An embodiment consistent with the invention may comprise a system for accessing offline voicemail messages. The system may comprise a memory storage and a processing unit coupled to the memory storage. The processing unit may be operative to receive a voicemail message, transcribe the voicemail message to text, store the voicemail message, present a recipient with a list of voicemail messages, retrieve the voicemail message, and allow a recipient to annotate the voicemail message.

Another embodiment consistent with the invention may comprise a system for providing accessing offline voicemail messages. The system may comprise a memory storage and a processing unit coupled to the memory storage. The processing unit may be operative to receive a voicemail message, download the voicemail message, transcribe the voicemail message to text, store the voicemail message, present a recipient with a list of voicemail messages, select a voicemail from the list, retrieve the voicemail message, allow a recipient to annotate the voicemail message, and synchronize the annotated voicemail message with a server.

Figure 6:
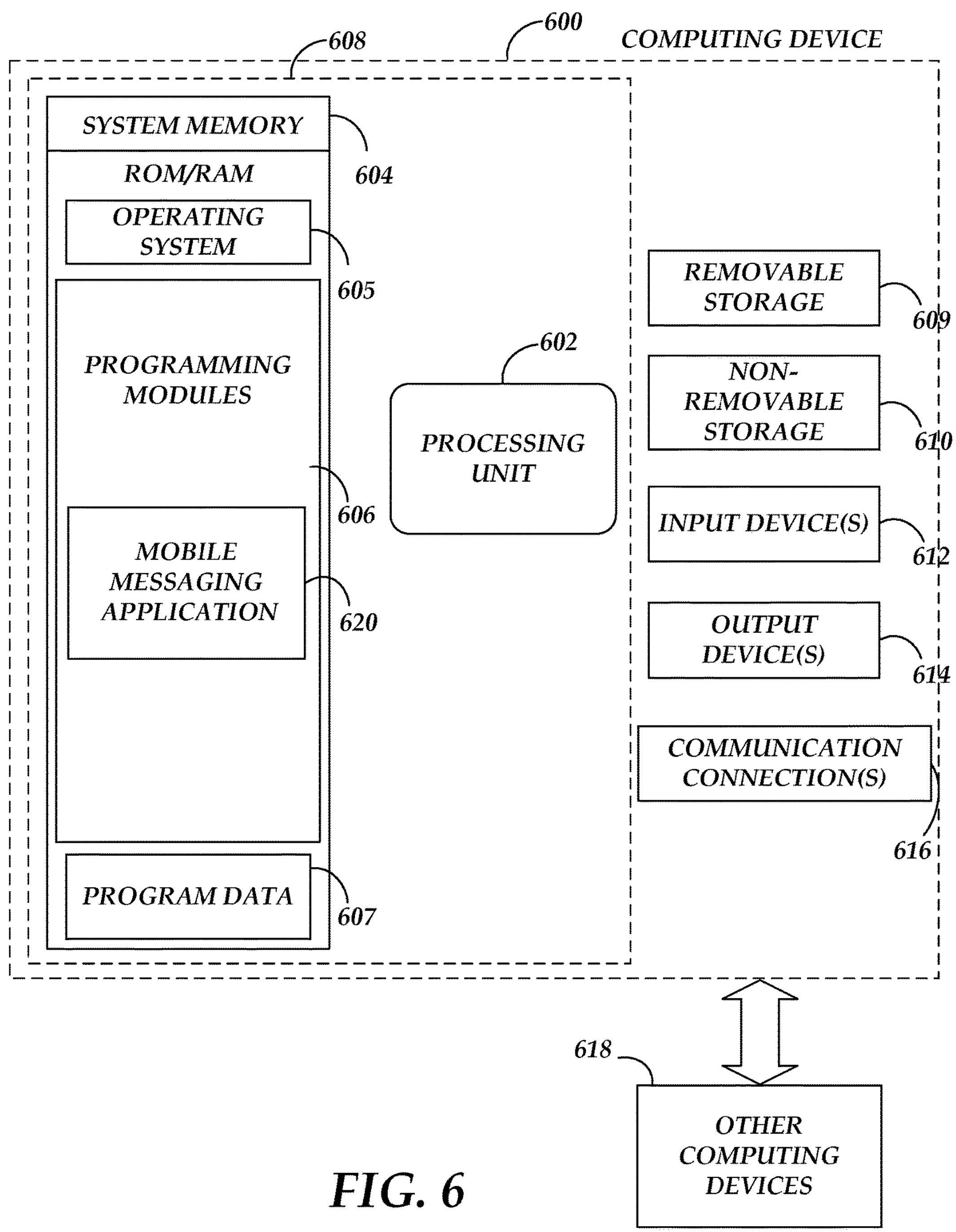
FIG. 6 is a block diagram of a system including a computing device.

FIG. 6 is a block diagram of a system including computing device 600. Consistent with an embodiment of the invention, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the invention. Furthermore, computing device 600 may comprise an operating environment for server 102 as described above. Server 102 may operate in other environments and is not limited to computing device 600.

With reference to FIG. 6, a system consistent with an embodiment of the invention may include a computing device, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include a mobile messaging application 620. Furthermore, embodiments of the invention may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 may perform processes including, for example, one or more method 200's and 500's stages as described above. The aforementioned process is an example, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A computer storage device that stores a set of instructions which, when executed by at least one processor, performs a method for annotating voicemail messages, the method executed by the set of instructions comprising:

receiving a voicemail message;

transcribing an audio portion of the voicemail message to text;

presenting a recipient with a text transcription of the voicemail message;

receiving a context note to the text transcription of the voicemail message from the recipient to form an annotated transcription, the annotated transcription of the voicemail message including the context note; and presenting the annotated transcription including the context note to the recipient.

2. The computer storage device of claim 1, wherein the method further comprises synchronizing the annotated transcription of the voicemail message with a server.

3. The computer storage device of claim 1, wherein transcribing the voicemail message to text comprises integrating the text transcription and the voicemail message.

4. The computer storage device of claim 3, wherein integrating the text transcription and the voicemail message comprises switching from the text transcription to the voicemail message, wherein switching from the text transcription to the voicemail message comprises:

selecting a point in the text transcription; and playing the voicemail message from the selected point in the text transcription.

5. The computer storage device of claim 1, wherein the method further comprises encrypting and decrypting the text transcription and the voicemail message.

6. The computer storage device of claim 1, further comprising:

presenting the recipient with a list of voicemail messages by sorting a communication history based on a sender.

7. The computer storage device of claim 6, wherein presenting the recipient with the list of voicemail messages comprises presenting a recipient interface, wherein presenting the recipient interface comprises presenting actions to the recipient.

8. The computer storage device of claim 7, wherein presenting actions comprises at least one of the following:

previewing the text transcription;

listening to the voicemail message;

deleting the voicemail message;

replying to the voicemail message;

flagging the voicemail message;

annotating the voicemail message; or calling back a number from the voicemail message.

9. The computer storage device of claim 8, wherein replying to the voicemail message comprises replying to the voicemail message with at least one of the following: a telephone call, an electronic mail message, or a mobile message.

10. The computer storage device of claim 1, wherein retrieving the voicemail message comprises enabling the recipient to retrieve the voicemail message without dialing into a service.

11. The computer storage device of claim 1, wherein retrieving the voicemail message comprises:
enabling the recipient to read the text transcription of the voicemail message; and
enabling the recipient to listen to the voicemail message.

12. The computer storage device of claim 1, wherein receiving the voicemail message comprises:
recognizing at least one of the following: a telephone number or a sender; and
generating sender information, wherein generating sender information comprises at least one of the following:
providing an electronic mail address,
providing a physical address,
providing a website link, or
providing other configured information about at least one of the following: the recognized telephone number or the recognized sender.

13. The computer storage device of claim 1, wherein transcribing the voicemail message to text comprises denoting unrecognized voicemail speech in the voicemail with at least one of the following: font, color, and size.

14. The computer storage device of claim 1, wherein the method further comprises receiving a notification of at least one missed call.

15. A method for accessing offline voicemail messages, the method comprising:
receiving voicemail messages and missed calls on a server;
transcribing audio portions of the voicemail messages to text transcriptions;
downloading the voicemail messages and the missed calls to a recipient's device, wherein the recipient's device is at least one of the following: a mobile device or a client computer;
presenting a recipient with a list of the voicemail messages and the missed calls;
receiving a request, from the recipient, to retrieve one of the voicemail messages from the list of the voicemail messages;
retrieving the voicemail message from the recipient's device, wherein the voicemail message is in a form of an electronic mail message;
receiving a context note to the text transcription of the voicemail message from the recipient to form an annotated transcription of the voicemail message, the annotated transcription of the voicemail message including a context note;
storing the annotated transcription of the voicemail message on the recipient's device;
presenting the annotated transcription including the context note to the recipient; and
synchronizing the recipient's device with the server, wherein synchronizing the recipient's device with the server comprises:
synchronizing the annotated transcription of the voicemail message with the server, and
receiving notifications of new voicemail messages and new missed calls.

16. The method of claim 15, wherein transcribing the voicemail message to text comprises denoting unrecognized voicemail speech in the voicemail with at least one of the following: font, color, and size.

17. A system for accessing offline voicemail messages, the system comprising:
a memory storage; and
a processing unit coupled to the memory storage, wherein the processing unit is operative to:
receive a voicemail message;
transcribe an audio portion of the voicemail message to text using a transcription application; and
display a text transcription of the voicemail message, wherein the text transcription displays voicemail speech that is not recognized by the transcription application using one of: a font, a color, or a size.

18. The system of claim 17, wherein the processing unit is further operative to integrate the text transcription and the voicemail message.

19. The system of claim 18, wherein the processing unit being operative to integrate the text transcription and the voicemail message comprises the processing unit being operative to:
switch from the text transcription to the voicemail message, wherein being operative to switch from the text transcription to the voicemail message comprises being operative to select a point in the text transcription to switch from the text transcription to the voicemail message; and
play the voicemail message from the selected point in the text transcription.

20. The system of claim 17, wherein the processing unit being operative to present the recipient with the list of voicemail messages comprises the processing unit being operative to present a recipient interface, wherein the recipient interface is configured to present actions to the recipient.

* * * * *